US009501719B1

(12) United States Patent
Horovitz et al.

(10) Patent No.: US 9,501,719 B1
(45) Date of Patent: Nov. 22, 2016

(54) SYSTEM AND METHOD FOR VERIFICATION OF THREE-DIMENSIONAL (3D) OBJECT

(71) Applicant: EYECUE VISION TECHNOLOGIES LTD., Yokneam Ilite (IL)

(72) Inventors: Ronen Horovitz, Haifa (IL); Shai Feder, Haifa (IL); Ran Kaftory, Kiryat Tivon (IL)

(73) Assignee: EYECUE VISION TECHNOLOGIES LTD., Yokneam (IL)

(*) Notice: Subject to any disclaimer, the term of this patent is extended or adjusted under 35 U.S.C. 154(b) by 0 days.

(21) Appl. No.: 14/525,293

(22) Filed: Oct. 28, 2014

Related U.S. Application Data

(60) Provisional application No. 61/896,167, filed on Oct. 28, 2013.

(51) Int. Cl.
*G06K 9/00* (2006.01)
*G06K 9/62* (2006.01)

(52) U.S. Cl.
CPC ......... *G06K 9/6202* (2013.01); *G06K 9/00201* (2013.01)

(58) Field of Classification Search
USPC ........ 382/154, 209, 218, 284, 294; 345/419, 345/653, 664
See application file for complete search history.

(56) References Cited

U.S. PATENT DOCUMENTS

| 7,003,134 | B1* | 2/2006 | Covell | G06K 9/00369 382/103 |
| 7,027,054 | B1* | 4/2006 | Cheiky | H04N 5/262 345/473 |
| 7,296,231 | B2* | 11/2007 | Loui | G06F 17/30802 348/584 |
| 7,508,425 | B2* | 3/2009 | Belz | H04N 1/00204 348/231.2 |
| 7,669,123 | B2* | 2/2010 | Zuckerberg | G06F 17/30867 715/273 |
| 7,813,822 | B1* | 10/2010 | Hoffberg | G06K 9/00369 381/73.1 |
| 7,853,046 | B2* | 12/2010 | Sharony | A01K 29/00 356/603 |
| 8,018,579 | B1* | 9/2011 | Krah | G01B 11/00 356/4.01 |
| 8,180,130 | B2* | 5/2012 | Sebok | G06T 7/0044 378/20 |
| 8,352,859 | B2* | 1/2013 | Zuckerberg | G06F 17/30867 715/273 |
| 2013/0135081 | A1* | 5/2013 | McCloskey | G07C 9/00111 340/5.8 |

* cited by examiner

*Primary Examiner* — Yosef Kassa
(74) *Attorney, Agent, or Firm* — Siritzky Law, PLLC

(57) ABSTRACT

A system and method of determining whether an object captured in a series of images is a three dimensional object or an image of an object by comparing image data of the object captured in the images at various angles relative to the object, to image data of one or more reference images of an actual object. The image data derived from the captured images may vary with the different angles at which such images were captured and such variances may be compared to the reference images, whereas image data of an image of an object will not comparably vary.

21 Claims, 5 Drawing Sheets

SYSTEM AND METHOD FOR VERIFICATION OF THREE-DIMENSIONAL (3D) OBJECT

CROSS REFERENCE TO RELATED APPLICATIONS

This application claims the benefit of U.S. Provisional Application No. 61/896,167, filed on Oct. 28, 2013 entitled "METHOD FOR VERIFICATION OF GENUINE OBJECT WHEN USING 3D OBJECT RECOGNITION", incorporated herein in its entirety.

FIELD OF THE INVENTION

Embodiments of this invention pertain generally to image recognition and interactive entertainment. Some embodiments of the invention relate to using a camera and a processor of a mobile device to verify genuineness of an object in an image.

BACKGROUND OF THE INVENTION

Advanced technologies allow manufacturers to create products which connect the physical world to a digital world. Recent examples in the toy and game industries use radio frequency identification/near field communication (RFID/NFC) chips inside toy figures to allow recognition of these figures by an RFID sensor which is connected to the toy or game platform in order to trigger digital content in a toy or game experience. RFID is a reliable but expensive technology that requires adding costs to the figures and also requires an RFID reader to be used.

A different approach can save the costs of adding RFID chips to figures and at the same time allow the toy or game platform to include users with a mobile device such as a smartphone or tablet that lacks an RFID reader. This approach may use a built-in camera in these devices for recognition, for example of a toy figure, based on computer vision and image processing algorithms.

Such algorithms for three dimensional (3D) object recognition are well known and are mostly based on feature extraction, for example comparing extracted features to a database of features. The database may have been created by applying a learning phase on several captured images of the object to be recognized from different angles and perspectives.

A logical problem then arises which can create huge losses for manufacturers of such 3D figures, as a recognition algorithm based on a captured image cannot differentiate between a genuine 3D object and a printed or displayed image of such object. Users of such games can trick the game by showing an image on a screen or a printed image instead of the real 3D figure.

SUMMARY

Embodiments of the invention provide methods, systems, devices and computer program products for determining that an object depicted in images is a three dimensional (3D) object, for example as opposed to a two-dimensional (2D) object. According to some embodiments, image data based on multiple captured or received images purporting to show the same object (possibly from different camera angles) are compared to reference data. The reference data may be based on multiple images of a reference object with each of said multiple images corresponding to a different value of at least one image parameter. Examples of image parameters include but are not limited to viewing angle and focal point. A comparison of the first and second image data with the reference data can be used to determine that the depicted object is a 3D object, for example using one or more predetermined criteria for the comparison. In this application, "angle" or "viewing angle" may include rotation angle and elevation angle. However in embodiments of the invention one of the rotation and elevation angle may be constant for all images and the other may differ from one image to another. The parameter which differs between images, such as rotation or elevation viewing angle, may be determined depending on what is most appropriate for the object.

It will be appreciated from the foregoing that the reference data may be described as image data since it is based on or derived from images of a reference object. However in this application the term "reference data" is used to denote data based on or derived from images of a reference object, and the term "image data" is used to denote data based on images of a different object, such as the object whose image is captured by a user. Embodiments of the invention may be used in ascertaining the likelihood of the object whose image is captured by a user is a 3D object rather than an image of an object.

Embodiments of the invention may not determine with certainty that the depicted object is a replica of, or matches the reference object. Embodiments may simply determine above-threshold likelihood that the depicted object is three dimensional object with certain characteristics of the reference object, and not two dimensional depiction of the reference object. Embodiments of the invention may lower the likelihood of someone circumventing a requirement for capturing an image of a particular three dimensional object. According to some embodiments of the invention, there is provided a technique for categorizing an object depicted in images as being a 3D version of a particular reference object.

According to other embodiments of the invention, instead of or in addition to comparing image data to reference data, image data from different images of an object that are captured by a user may be compared to each other to determine whether the depicted object is a 3D object. For example the different images may be captured with a camera focused on different parts of the field of view, such as foreground and background or different parts of the object itself. Images of a three dimensional object captured in this way should show more marked differences from each other in terms of focus of the depicted object than such images would show if the object were two dimensional.

Embodiments of the invention may be enhanced using known image processing techniques such as removal of or equalizing the amount of background so that images or image data are compared like for like with reference data or with each other.

Embodiments of the invention may be used in the authentication or permission of a user to use (e.g., execute) a computer program such as but not limited to a game or gaming application.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION

Figure 1C:
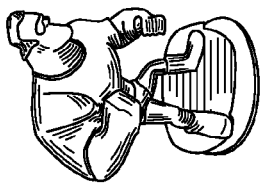
FIGS. 1A, 1B and 1C show a series of images of a three dimensional object according to embodiments of the invention.

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Unless specifically stated otherwise, as apparent from the following discussions, it is appreciated that throughout the specification, discussions utilizing terms such as "selecting," "evaluating," "processing," "computing," "calculating," "associating," "determining," "comparing", "combining" "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution by for example one or more processors results in a method of an embodiment of the invention. In some embodiments, one or more components of a system may be associated with other components by way of a wired or wireless network. For example one or more memory units and one or more processors may be in separate locations and connected by wired or wireless communications to execute such instructions.

As used in this application, and in addition to its regular meaning, the term mobile device may refer to cell phone (cellular telephone), smart phone (smart telephone), handheld game console, tablet computer or other electronic device having a power source, processor, memory unit, image processor, input device suitable for receiving a signal or input from a user for activation of a function of the electronic device, an output unit such as a screen or loudspeaker suitable for delivering a signal, and a wireless transmitter and receiver.

As used in this application and in addition to its regular meaning, the term 'a 3D object in an image' may refer to captured image data of a physical or real-world object that is present in a field of view of a camera or image capture device. In some embodiments such object may be a three dimensional object such as a person, face, furniture, doll, action figure or other physical object. A 3D object in an image excludes a picture or image of an object that may have been printed on for example paper or some other medium or that may be shown on a screen to depict a 3D object.

In this application the term "match" is used in the context of comparison, for example of one parameter with another or one set of data with another. It will be appreciated that "match" may not mean precise identity and may signify identity within predetermined limits of tolerance.

In some embodiments, a process of verification or determination comprises scanning or capturing two or more images of a 3D object with a camera or image capture device such as those found on mobile electronic devices, allowing the object or a portion thereof to be contained in the field of view of the camera, having the object or a part thereof to be recognized from that first angle, and then moving the camera equipped mobile device to allow recognition of the same object but from a different viewing angle. The series of images may be captured using visible light.

Figure 2C:
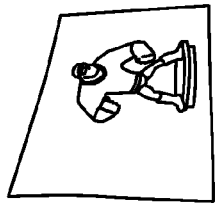
FIGS. 2A, 2B and 2C show a series of images of a photograph of the three dimensional object of FIG. 1 according to embodiments of the invention.
Figure 1B:
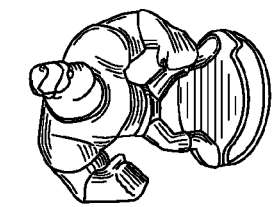
Figure 2B:
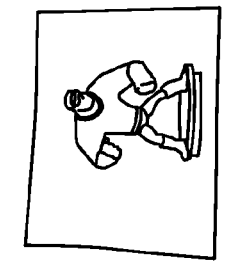
Figure 1A:
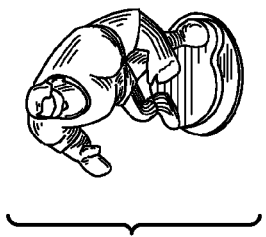
Figure 2A:
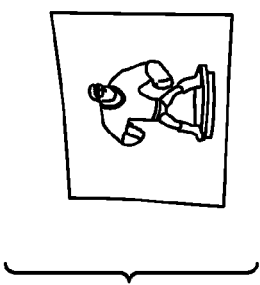

FIG. 1 and FIG. 2 each shows a series of images of an object captured at different angles. In FIG. 1 the images show a 3D object and in FIG. 2 the images show a 2D object, in this example a photograph or image (e.g., a digital image, a digital photograph, or another type of photograph) of the same 3D object, thus in FIG. 2, the "object" is the photograph rather than a 3D object. A comparison of the two series of images shows that there is very little difference between different images of the two dimensional (2D) photograph as compared to the different images of the 3D object itself. In other words, significant differences between successive images of the same object from different angles are only apparent when using a real 3D figure. These are due to changes in the physical appearance of the 3D object at different viewpoints. To take a simple example, for a human figure the nose will be seen at least partially in profile when seen from some angles but not when viewed from the front.

A number of techniques are available for recognition of a 3D object in an image. For example, recognition of a 3D object from a single image can be achieved by using known computer vision algorithms that detect and describe local features in images, such as Scale invariant feature transform (SIFT), fast-retina key point (FREAK), speeded up robust features (SURF) and the like. Such algorithms are based on detection of key points and their corresponding descriptors. Key points may be image features which are easily discernable in an image and may be invariant or relatively invariant to scale, rotation and translation of the image. The key points visible in a 2D image of a 3D object may vary between one image and another depending on object viewing angle. For example a complete 180 degree rotation of the object may hide a key point. Examples of key points include but are not limited to corners and other highly localized gradients, logos and color distribution (e.g. red t-shirt, black trousers, brown hair). These can be detected in various color channels of any color space (Red, Green, Blue or hue saturation lightness (HSL) or hue saturation value (HSV), or YCbCr, etc. . . . ) or in combined color channels. Descriptors are features which are computed locally around these key points and store local information such as intensity, gradient and spatial relations to neighboring pixels around the key points. A set of key points and associated descriptors may be referred to as a "signature" for the image or the object which it depicts. Other methods or algorithms for generating a signature for an image or an object will be known to those skilled in the art. Different methods of signature generation may be used depending for example on what parameters in respective images are to be compared. Embodiments of the invention may use image data, for example based on key points and optionally their associated descriptors, or signatures, rather than complete images, in order to determine whether an object captured in images is actually three dimensional.

Embodiments of the invention may use a prior learning phase involving a reference 3D object. To take the example of a computer game that is intended to be played, for example on a communication device such as but not limited to a tablet computing device, with a particular toy, such as a figure, the reference object may be one such figure. More generally the reference object may be a 3D object with which the computer program was intended to be used, or which is required to authenticate or verify the user to use the computer program. The verification or authentication may be performed by a processor in the computing device or another computing device communicating with the first mentioned computing device, for example using a non-transitory computer readable medium according to embodiments of the invention. The authentication may be performed in the same way as entering a user name and/or password. For example images of a 3D object may be required in place of a password or other authentication or verification data. A computing device may be configured not to open a game application on a computing device if the images do not satisfy one or more comparison criteria.

In embodiments of the invention, in a learning phase, multiple images of the 3D reference object are taken from multiple angles. From each such image, image data or a set of image data may be extracted or generated, for example a set of key features or key points and descriptors of the object. The image data may be stored in memory as a database of features for that reference object. A learning phase may be used for multiple different reference objects and the database may then contain image data for multiple images of multiple reference objects.

According to some embodiments of the invention, when a computer program is being designed for use with a 3D object having known characteristics of key points, only the image data for the images of the corresponding reference object is used. According to other embodiments of the invention, when a computer program is designed for use with any of a plurality of 3D objects, for example a family of toys, the image data for the images of reference objects corresponding to all of the plurality of 3D objects is used.

Along with the image data, for key features and descriptors, an indication of the angle at which the key point data was captured, may be stored. The angles may be equally or variably spaced. If for example, 5 images are taken from the left side of a 3D object through its right side, then a suitable difference between the angles at which those consecutive images are taken is 180°/5=36°. If for example, 12 images are taken all around the 3D object, then a suitable difference between the angles of which those consecutive images are taken is 360°/12=30°. Such angle information may be stored with the corresponding result of the key points and descriptors information.

Embodiments of the invention may be used to recognize the reference object in a new image. The new image may be captured by a user in response to instructions or directions provided through a user interface as part of an object recognition algorithm running on a user device such as a phone equipped with a camera. An object viewed in a new image may be referred to as a candidate object. It is to be examined for suitability for example to allow a user to use (e.g., execute) a computer program or play a game. The process of recognizing the candidate object in an image may be done using a method including comparison of image data such as key points. For example, key points may be extracted from an image or recognized in an image of the candidate object and compared to key point sets in the database. According to embodiments of the invention a match in a sufficient number of key points and their corresponding descriptors may allow classification the object depicted in the corresponding image from the set of reference objects. Using image data from multiple images of the reference object, this may be further narrowed down to the angle of which the camera was viewing the candidate object when the image was captured. If the camera was viewing the candidate object from an angle which was not used in the learning process, interpolation or approximation can be used to estimate the angle based on the level of similarity in image data corresponding to images taken at consecutive angles. For example, the angle can be estimated to be 45° if there is an equally strong match with both the 30° and the 60° image data or key point sets.

The process may be repeated for different camera images at different angles, for example with the camera scanning the object. In such way, a complete analysis of the trajectory of the camera equipped device in relation to the scanned object can be calculated.

This trajectory analysis is possible if the reference object corresponds to the scanned object but may not be possible if it does not. For example, since an image of an object cannot change the appearance of the object in it, if such a process is used on a printed or 2D image of a 3D object then the recognition results may always denote the same angle for recognition, thus implying that a 3D object is not captured in the image. This is clear from an examination of the successive images in FIG. 2.

To further achieve a successful determination of having or viewing a genuine 3D object, and prevent the possibility of a user quickly exchanging printed or displayed images of the object that were captured from multiple angles, according to embodiments of the invention a tracking mechanism may be applied on the candidate object or specific object features. This mechanism may run simultaneously with the recognition algorithm. According to some tracking algorithms that may be used, local features such as key points are searched in any given frame based on their prior location and velocity of change. Thus for example tracking could take place in the time between capture of a first image at a first viewing angle, and the capture of a second image at a second viewing angle which would require the camera to remain switched on. Such tracking will fail when one image is exchanged for another, for example the feature being tracked may disappear out of range. This may be used to infer that the object being viewed is not a genuine 3D object.

It follows from the foregoing that according to some embodiments of the invention, a candidate object may be rejected if the camera is switched off between the capture of successive images of the candidate object at different viewing angles.

A user may try to circumvent a requirement to be in possession of a particular 3D object by displaying on a video display, a video of the object being rotated from one angle to the other. Images from the video display may then be captured to represent the object at different viewing angles but this will not require any movement of a camera relative to the object. To prevent this possibility from succeeding, embodiments of the invention may use an examination of the outputs from a motion sensor and/or gyro/accelerometer sensor which are commonly present in mobile devices. Such output can help to determine whether the user is physically scanning the object or not, for example during the operation of the recognition algorithm. If the output of these sensors signals that the mobile device is static, this implies that the object being viewed is not a genuine object. Such embodiments of the invention may use instructions to the user to move the camera rather than the object in order to vary the viewing angle between successive images.

A user may try to circumvent this measure by displaying on a video display a video of the 3D object being rotated from one angle to the other and at the same time spinning the video display and mobile device from side to side. Thus according to embodiments of the invention, it is possible to apply a random element of an instruction or directions by the mobile device to the user to scan the 3D object in a specific sequence, in response to which the user may follow the instructions and take the appropriate action. For example: 'Scan from left side to middle position and then from middle position back to left side', etc. Such a random request can prevent the user from succeeding by creating a video of the object beforehand, e.g. prior to the running of the recognition algorithm.

In another embodiment, the LED light or other illumination facility, which is found on many mobile devices, can be switched on, for example in response to an instruction or directions to the user, during the capture of images of the candidate object. This may prevent the possibility of a user succeeding with a video display, an image or video of the object since these displays or other flat surfaces may be highly reflective. Reflection of light used to illuminate the object can be used in a number of ways.

In one example, a reflection of an illumination source on a flat surface such as a display screen, or possibly even a printed image, can impair the image and therefore hinder or distort any comparison process. For example, it may prevent the successful extraction of image data such as key features. Such reflection is less likely to be present in images of a suitable candidate 3D object. According to embodiments of the invention, similar illumination can be used in the generation of reference data so as to improve the likelihood of a correct match with images in which the candidate object is illuminated.

Alternatively or additionally, a technique for detecting the specular reflection of an illumination source such as an LED light source can be employed in parallel to the recognition algorithm. If any such reflection is found, or an amount above a predetermined threshold, this will imply that the object being viewed is not a genuine 3D object but rather a reflective flat surface such as a video or other display screen.

Figure 3:
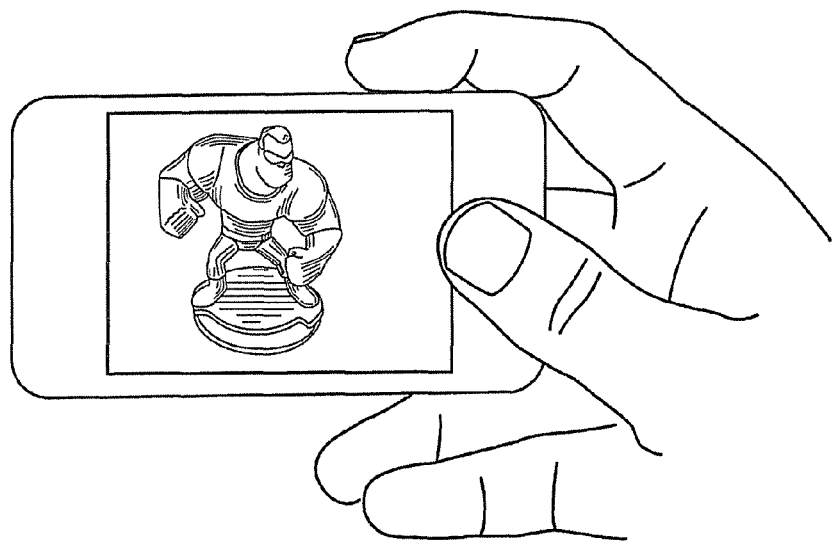
FIG. 3 shows a hand held mobile computing device in the form of a smart phone suitable for implementing embodiments of the invention.

The effect of reflection is illustrated in FIG. 3 which shows a mobile phone viewing a display screen on a tablet computing device which itself has captured an image of a 3D object. An LED "torch" or "flashlight" on the mobile phone is turned on and is reflected from the screen of the tablet computing device thus distorting the image of the 3D object.

According to some embodiments of the invention, additionally or alternatively, other video or static screen display characteristics such as flickering which is caused by the display's picture refresh rate or granularity caused by the display's pixel matrix can be detected and used to determine whether a display is being used instead of a genuine 3D figure.

According to some embodiments of the invention, additionally or alternatively, changing the camera focus from the foreground to the background manually, for example in response to instructions to the user, or automatically may be used to verify whether a genuine 3D object is used. When a camera is focused on a genuine 3D object, the far background will be out of focus and vice versa—when the camera is focused on the far background, the object will be out of focus. These differences in focus can be measured and imply a real object is being used since a printed or a displayed image cannot exhibit such behavior.

The process to accomplish such verification is based on several different techniques that can be applied separately or in a combined manner.

Embodiments of the invention may be implemented in a computing device or a computing system. Such a device may comprise a mobile communication device or phone such as the one illustrated in FIG. 3, personal computer including but not limited to desktop or laptop, tablet computing device and any kind of hybrid computing device.

Figure 4:
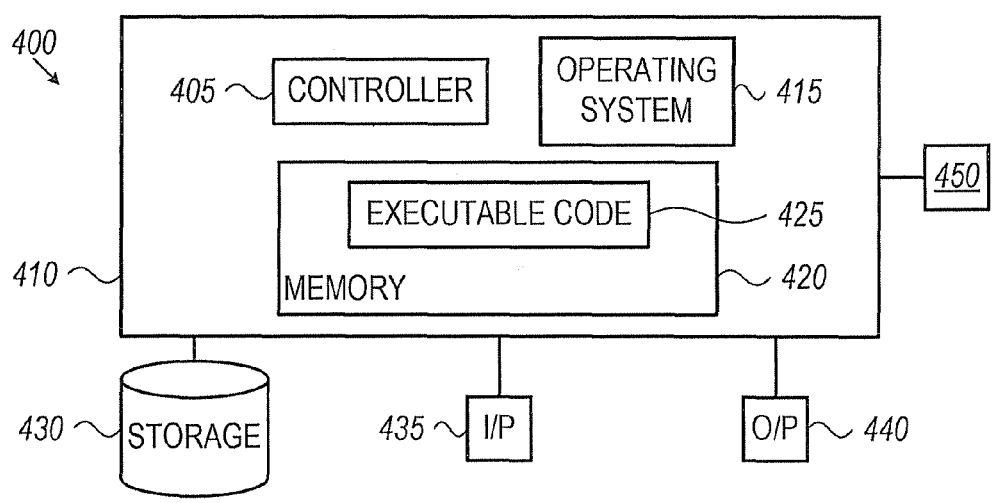
FIG. 4 shows components of a computing device suitable for implementing embodiments of the invention.

Components of a computing device according to embodiments of the invention will now be described with reference to FIG. 4. A computing system according to embodiments of the invention may include the same components shared across multiple computing devices.

Computing device 400 may include a computer 410 comprising controller 405 that may be, for example, a computer central processing unit processor (CPU), a chip or any suitable computing or computational device, an operating system 415 and memory 420. Computing device 400 may further include storage 430, a camera 450, one or more other input devices 435 and one or more output devices 440, any of which may be integrated or peripheral devices.

Controller 405 may be configured to carry out methods according to embodiments of the invention. For example, controller 405 may be connected to memory 420 storing software or instructions that when executed by controller 405 cause controller 405 to carry out a method according to embodiments of the present invention.

Operating system 415 may be or may include a code segment designed and/or configured to perform tasks involving coordination, scheduling, arbitration, supervising, controlling or otherwise managing operation of computing device 400, for example, scheduling execution of programs. Operating system 415 may be a commercial operating system. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 420 is a non-transitory processor-readable storage medium that stores instructions and the instructions are executed by controller 405. Memory 420 may be or may include a plurality of, possibly different memory units.

Memory 420 may store executable code 425 which may be any executable code, e.g., an application, a program, a process, task or script. Executable code 425 may be executed by controller 405 possibly under control of operating system 415. Where applicable, executable code 425 may carry out operations described herein in real-time.

In some embodiments, more than one computing device 400 may be used in place of a single computing device. For example, a plurality of computing devices that include components similar to those included in mobile computing device 300 of FIG. 3 may be connected to a network and used as a system, for example a distributed system.

According to some embodiments of the invention, for example, a first device may be used for the capture of images of the candidate object and one or other devices may be used to determine whether the candidate object is a 3D object. In one possible scenario, a user may wish to use a computer program such as a game on a laptop device but may find it more convenient to use a camera on his mobile phone to capture the images of the candidate object. Subsequent operations leading to a determination whether the object is a 3D object may be performed on the laptop or other user device or they may be performed on a remote device such as a server. Thus for example operations that form part of methods according to embodiments of the invention may be distributed between one or more user devices and one or more other computing devices such as servers depending on device capacity, convenience of operation and other considerations. For example, one device having components similar to those shown in FIG. 4 may be used to capture images, and another device having components similar to those shown in FIG. 4 may be used to analyze the images according to embodiments of the present invention.

Storage 430 may be or may include, for example, a hard disk drive, a Compact Disk (CD) drive, a CD-Recordable (CD-R) drive, a universal serial bus (USB) device or other suitable removable and/or fixed storage unit. In some embodiments, some of the components shown in FIG. 4 may be omitted. For example, memory 420 may be a non-volatile memory having the storage capacity of storage 430. Accordingly, although shown as a separate component, storage 430 may be embedded or included in memory 420.

Storage device 430 may store a database of reference data. Alternatively this may be stored remotely from user equipment and for example accessed via a remote server.

Camera 450 may be any kind of camera that may be integrated into a computing device as is known in the art and may provide input to computer 410, e.g. a digital camera providing digital still and or moving image data.

Other input devices 435 may be or may include a mouse, a keyboard, a touch screen or pad or any suitable input device. It will be recognized that any suitable number of input devices may be operatively connected to computing device 400 as shown by block 435.

Output devices 440 may include one or more displays, speakers and/or any other suitable output devices. It will be recognized that any suitable number of output devices may be operatively connected to computing device 400 as shown by block 440.

A set of operations that may be implemented in a computing device according to embodiments of the invention, will now be described with reference to FIG. 5. It will be appreciated that the operations indicated in FIG. 5 do not need to be performed in the specific order shown. The operations of FIG. 5 are described in relation to the operation of a computer game but it will be appreciated that the same principles could be used for the operation of any kind of computer software.

Figure 5:
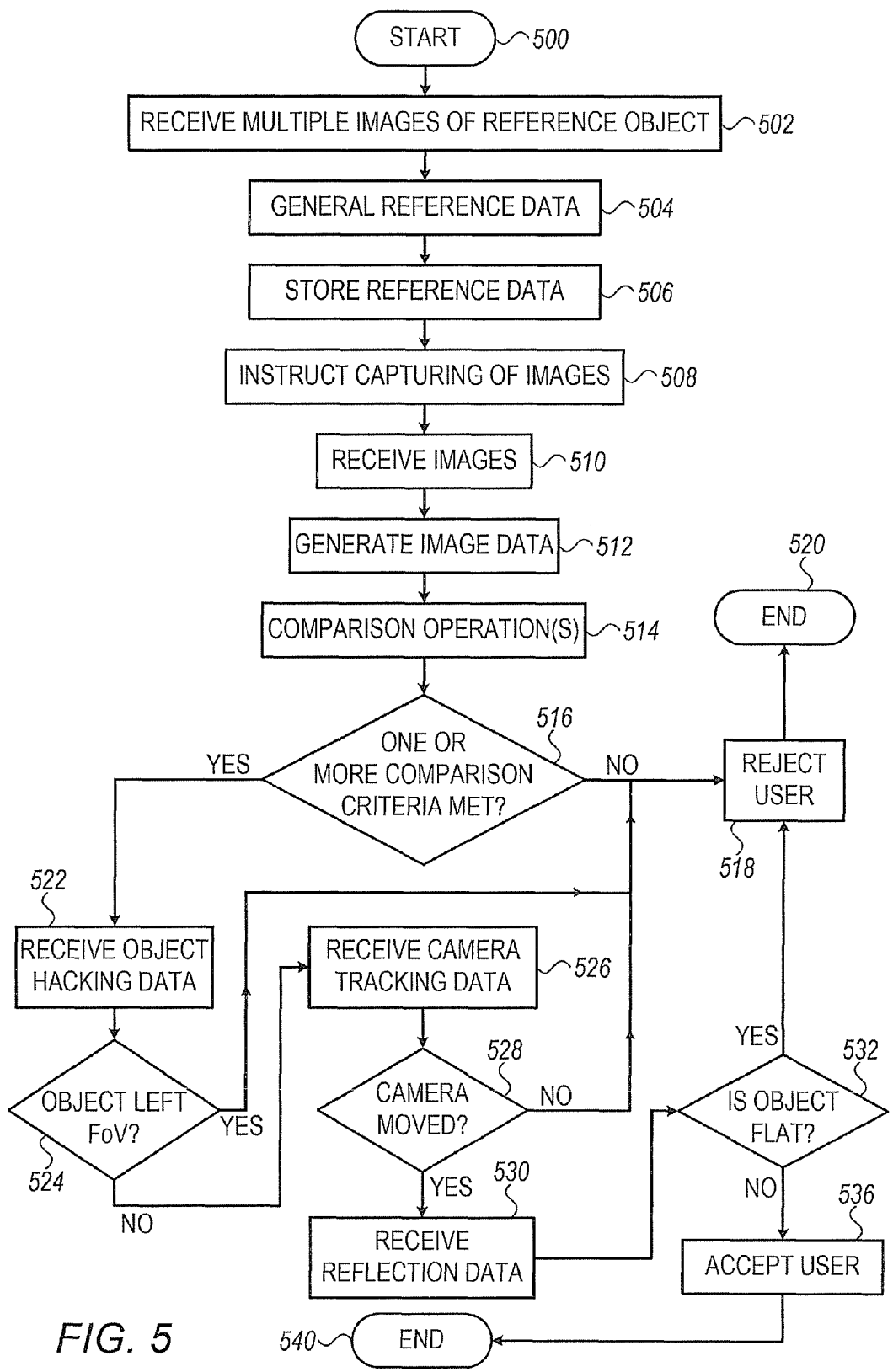
FIG. 5 is a flow chart illustrating operations that may be performed in methods according to embodiments of the invention.

The flow shown in FIG. 5 commences with initialization 500 followed by operation 502 at which multiple images of a reference object, for example a first reference object of a set of reference object, are received. Each image corresponds to a different value of at least one image parameter, for example object viewing angle. At operation 504 the multiple images of the reference object are used to generate reference data. Thus the reference data is derived from the images. The reference data may include a data set for each image that includes less data than the image itself and may be used to compare one image to another. Examples of reference data include but are not limited to a signature for each of the multiple images or a set of key points optionally with descriptors for each image from which the key points are derived. The reference data may include a value for an associated image parameter, e.g. viewing angle. In other words the reference data may identify viewing angles for the images on which it is based. At operation 506 the reference data is stored, for example in data store 430 shown in FIG. 4.

Operations 502-506 may be repeated or iterated for additional reference objects.

According to some embodiments of the invention the reference data may be pre-generated and received at a computing device according to the invention, for example without the images of the reference object. Thus it need not be stored at a computing device according to embodiments of the invention but may be retrieved from a remote storage facility, for example on request, for example in response to installation or initiation of a computer program with which the reference object is intended, or in response to receipt of an image or image data relating to an object purporting to be the object for which the game was intended.

The foregoing operations can be regarded as being part of a preparation or learning phase, which could take place even before the design of the computer game for which a certain 3D object is required. The following operations may take place as part of a user authentication phase.

At operation 508 instructions or directions are provided for the capturing of images using a camera of an object purporting to be the 3D object required in conjunction with the computer game, in response to which the user may follow the instructions and take the appropriate action. These may be provided via any kind of output, for example to a user visually using a display screen or audibly using one or more speakers. Visual instructions may be provided in text or graphic form. Instructions provided at operation 508 may also include instructions that are output directly to a camera and implemented without human intervention. Depending on the type and controllability of the cameral, some or all of the instructions may be complied with automatically.

These instructions or directions may include instructions to capture images of a single or same object using different operating parameters in response to which the user is intended follow the instructions and take the appropriate action, such as but not limited to move the camera or capture an image. Embodiments of the invention may provide methods and systems for determining whether those instructions have been correctly followed. The operating parameters may include but are not limited to viewing angle and focal point. Either or both of the instructions or the operating parameters at which one or more of the images are captured may include a randomly generated element so that they are not in a predictable order and are more difficult to "fool". The instructions may include instructions to capture more than two images from different angles with respect to the imaged object, for example so that a change in direction of camera movement is required following the capture of at least one image. The instructions may include a specific instruction to move the camera rather than the object when changing viewing angle. The instructions may include instructions relating to the use or non-use of an illumination source such as a computing device integrated illumination source, or "flashlight" or "torch", to illuminate the object prior to the capture of at least one image of the object.

At operation 510, images are received, for example images captured by a camera, for example in response to the instructions. According to embodiments of the invention these images are received in response to instructions provided at operation 508. In some embodiments a processor or controller may receive image data such as for example key point data that may have been derived from or based on one or more images captured by a camera at for example a first angle to an object, and image data such as for example key point data that may have derived from a second image of the object that may have been captured at a second angle from the object to the camera. At operation 512 image data, such as a signature or set of key points and optional descriptors, is generated by for example a processor or controller 405 that may analyze the received images. Thus at operation 512 first image data may be generated based on or derived from a first image and second image data may be generated based on or derived from a second image, the first and second images purporting to be images of a (the same) 3D object matching the reference object. This image data may be generated from the received images in the same way that the reference data is generated from the images of the reference object at operation 504. Thus both may use the same processing operations to reduce the original image data to a set of data to improve the efficiency and speed at which two images may be compared. It should be noted here that embodiments of the invention may use any number larger than two of images, or image data, for comparison with reference data. Thus the generation of image data from images may be performed any number of times.

A computing device according to embodiments of the invention may alternatively receive image date, for example pre-generated image data such as signatures or key points derived from images captured by a camera, and may not receive the complete images, for example to save on the amount of data being transferred between devices.

Figure 6:
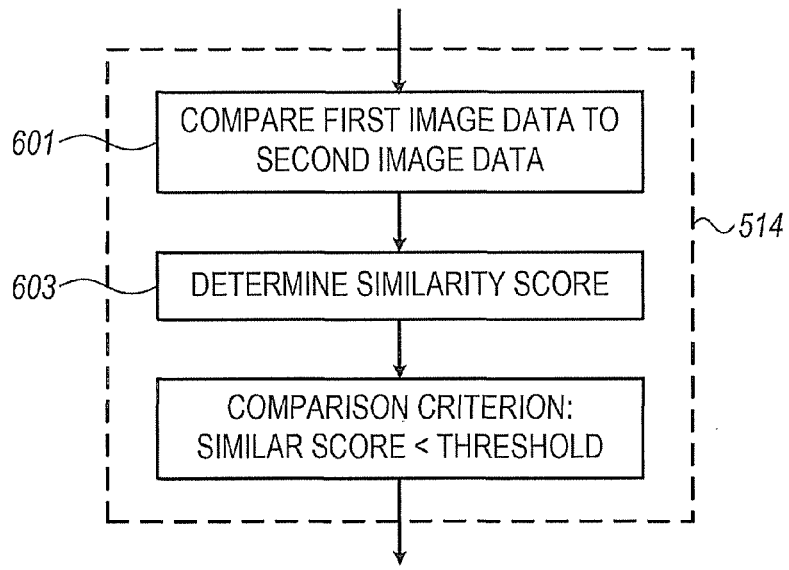
FIG. 6 is an example of comparison operations in accordance with an embodiment of the invention.
Figure 7:
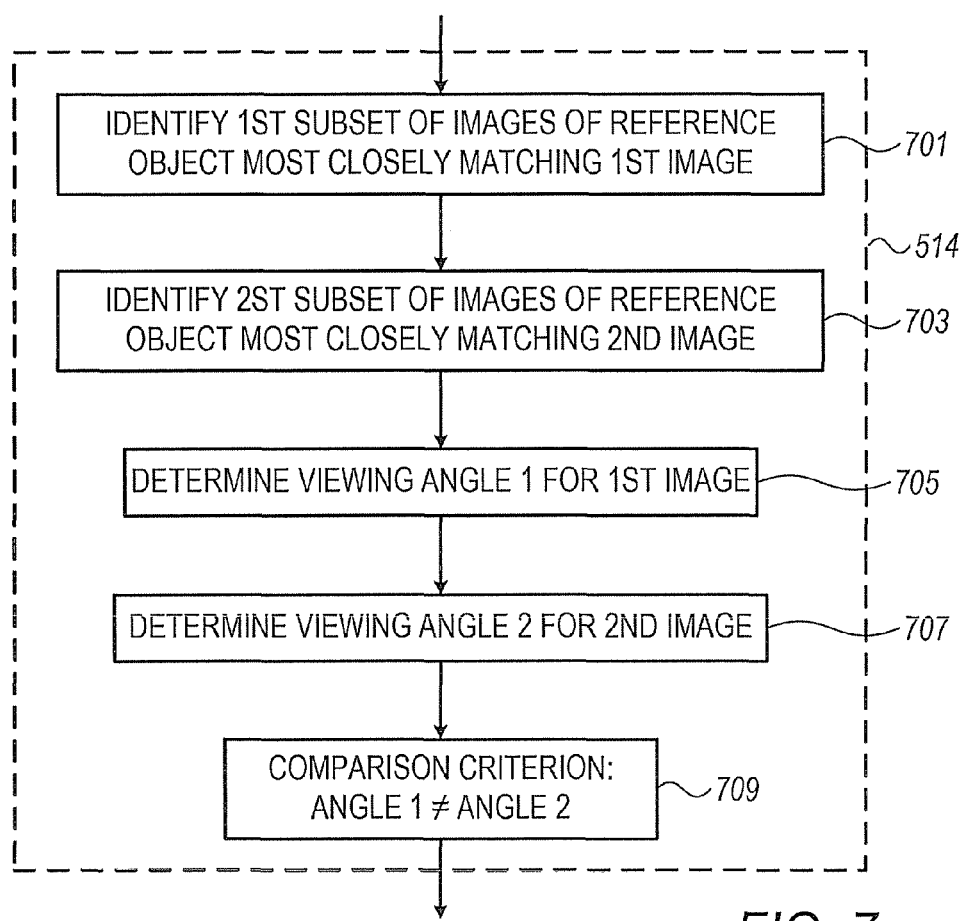
FIG. 7 is an example of comparison operations in accordance with an embodiment of the invention.
Figure 8:
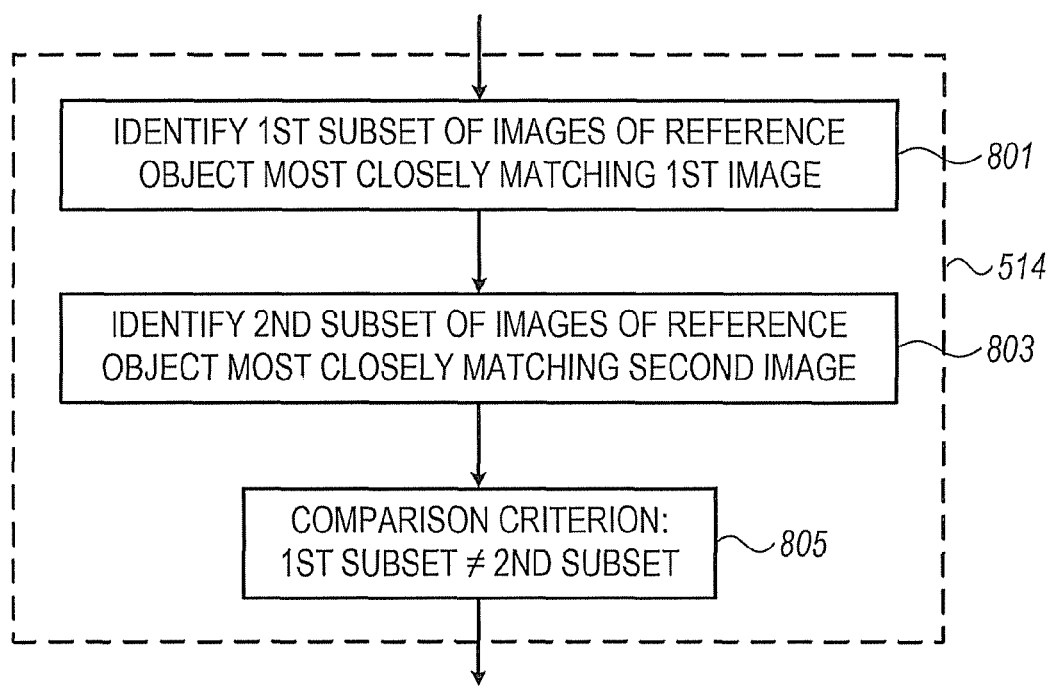
FIG. 8 is an example of comparison operations in accordance with an embodiment of the invention.

At operation 514, the first set of image data and second set of image data may be compared to reference data. It may be determined that the first and second images depict a three dimensional object if the result of the comparison satisfies one or more predetermined criteria. According to some embodiments, one or more comparison operations are performed using the image data and the reference data or both and at operation 516 it is determined whether one or more comparison criteria are met or satisfied. Examples of comparison operations that may be carried out as part of operation 514 are illustrated in FIGS. 6, 7 and 8. For example, if key point data of an object in an image was generated for a first image at a first angle of the object to the camera and for a second image at a second angle of the object to the camera, such key point or other image-derived data may be compared to reference data that is known and stored about the object at a variety of angles. This variety may include rotational angles or elevation angles or both, for example depending on the nature of the reference object. The reference data may have been derived from multiple images of the reference object that were also captured at various angles. Some of such reference images or the key point data derived therefrom from various angles may be comparable or similar to the angles at which the user's images were captured. Therefore values such as key point values that were captured of the object may correspond to one or more values of at least one image parameter of the images of the reference object. In some embodiments, such a parameter may include an object viewing angle of the object relative to the camera. In some embodiments, the image or reference data for one or more of the captured images may be used to determine a viewing angle for one or more captured images, and a calculation of a difference between the viewing angles of the images may be made as a way to determine that the two images were captured from different viewing angles. If the calculation indicates that the images were calculated from a same or substantially same angle or from angles that differ by less than a predetermined or minimum amount, then a user may be asked or instructed to capture additional images or an embodiment of the invention may deem the captured images to not be images of a 3D object.

Referring firstly to FIG. 6, it will be recalled that embodiments of the invention may not require the reference data and may determine whether a depicted object is three dimensional from images taken using different focal points, for example first and second images where the first image is captured with the camera focused on a first part of the field of view and the second image is captured with the camera focused on a second part of the field of view different from the first. According to this embodiment, a comparison of the first and second image data may be made at operation 601 and this may reveal whether the object is three dimensional. For example the comparison may be used to determine a similarity score for the first and second images at operation 603 based on the first and second image data. Various processes and algorithms are known in the art for the determination of a similarity score. For a three dimensional object, significant differences between the two images may be revealed that may not be present for a two dimensional object. Thus a comparison criterion applied in operation 605 that may be used at operation 516 may ask whether differences between the two images exceed a predetermined threshold. The larger the differences, for example the number of differences in corresponding key points in respective images, the lower the similarity score will be. Therefore the comparison criterion may be for example whether the similarity score is below a certain threshold or value. Only if the result is positive may the object be verified as a 3D object. The threshold for the differences or the similarity score or both may be determined from preliminary testing for example.

Additionally or alternatively, according to embodiments of the invention the reference data is used in determining whether a depicted object is three dimensional. If the reference data is based on images of multiple objects, a comparison using reference data at operation 514 may take place in two stages, a first to identify the closest reference object and a second to determine whether the depicted object is a three dimension object corresponding to the reference object. The first stage may be omitted. However it may be useful to eliminate reference data The second stage may be carried out in a number of ways using the reference data that uses images captured with different parameters. Two examples are explained with reference to FIG. 7 and FIG. 8. Others will occur to those skilled in the art.

In FIG. 7, in operation 701, using the reference data and the first image data, a first subset of the multiple images of the reference object is identified from the reference data as most closely matching the first image. This may be done on the basis of a similarity score, for example by comparing the first and second image data to the reference data to identify images which yield a similarity score above a predetermined threshold. The comparison may be done for example by comparing key points or features in the first image data with key points or features in the second image data. This subset may contain one or no images. The threshold could be adjusted, for example dynamically, in order to ensure that at least one image is identified or if desired no more than two images. In operation 703 the same is done for the second image, e.g. identifying using the reference data and the second image data, a second subset of the multiple images of the reference object that most closely match the second image.

At operation 705, assuming that operation 701 yielded at least one image, an object viewing angle is determined or identified for the first image. Similarly at operation 707 a viewing angle is determined or identified for the second image. If either of the subsets identifies only one image, the viewing angle will be the one recorded in connection with that image in the learning or preparation stage. If either of the subsets identifies two images, a viewing angle between the angles of the two images of the reference object.

Then a comparison criterion applied in operation 709 that may be used at operation 516 is that the viewing angles are not equal, for example they differ by at least a predetermined amount. The amount may be predetermined in a number of ways, for example based on preliminary testing.

An alternative series of operations that may provide a similar result, possibly more quickly, is shown in FIG. 8. Here in operation 801 the same operation as in operation 701 is carried out and in operation 803 the same operation as in operation 703 is carried out. Then instead of determining a viewing angle for the first and second images, it may simply be determined or identified whether operations 801 and 803 yielded the same subsets of images of the reference object. Thus a comparison criterion applied at operation 805 that may be used in operation 516 is that the subsets are not the same.

The effectiveness of the methods illustrated in FIGS. 7 and 8 can be understood from an examination of the drawings shown in FIGS. 1 and 2. Suppose that the objects in FIG. 1 are drawings of a reference object, and the positions of the arms are taken to be key points. For all of the images shown in FIG. 2, the subset of images of the reference object most closely matching is the centre image FIG. 1. Thus any two of the images shown in FIG. 2, taken as first and second object in an image, would yield the same viewing angle for each object in such image and therefore fail the comparison criterion of FIG. 7 and would yield the same subsets of images and therefore fail the comparison criterion of FIG. 8.

It should be noted that the comparisons carried out at operation 514 and subsequent operations may all be carried out without the images themselves. For example they may be done by comparing key points of image data with key points in the reference data, e.g. comparing key points in said first image data with key points in the reference data and comparing key points in the second image data with key points in the reference data. In all cases the image data or the reference data may be used both of which identify images of either an object captured in an image or a reference object. However the images themselves are not required.

The examples discuss only two images of the object purporting to be the genuine 3D object but it will be appreciated that other embodiments of the invention may use a greater number of such images.

Referring back to FIG. 5, a decision or determination is made at operation 516 whether the comparison criteria are met and if not, the user, e.g. the person whose equipment is supplying the images of a candidate object, is rejected and does not have permission to play the game. The rejection occurs at operation 518 and from there on this recognition process ends at operation 520. In some embodiments, if it is determined by a processor that the result of a comparison of criteria of the data from captured images to the data from stored images satisfy a criteria for similarity within a tolerance threshold, then the processor may determine that the object captured in the images is a three dimensional object. For example, if key point data derived from the first captured image at the first angle and the the second captured image at the second angle is within a tolerance range of stored key point data from various images of the object, then the object captured in the image may be determined to be or deemed a 3D object. Other predetermined criteria may be used as a basis for comparing data derived from captured images to stored image data.

If the criteria applied in operation 516 are met, the user may be accepted to play the game at operation 506. To take the example of a game application for which a particular 3D object is required, the result of the user being accepted may be that the game application is opened on a computing device on which it is installed, for example by a processor in the computing device or a remote computing device. This may be achieved by the processor issuing or transmitting an authentication signal in response to which the game application is opened. If the comparison criteria are not met, the user is rejected at operation 518 and the process ends at operation 520. However according to some embodiments of the invention, additional checks are carried before a user is accepted. Thus in operation 522, object tracking data may be received and analyzed. This data may track the position of the object between the time of capture of the first image and the time of capture of the second image. Note that this and any other additional data to be discussed could be received earlier in the process, for example at or around the same time that the image data is received or generated in operation 512. Also these additional checks may be performed in parallel with the comparison in operations 514 and 516 rather than in series as shown.

At operation 524 it is determined whether the analysis indicated that the object was removed from the field of view of the camera between the capturing of the first and second images. If it was the user is rejected at operation 518. If it was not the flow may continue to operation 526. Thus according to this embodiment of the invention, it will be determined that the object depicted in the images is not three dimensional unless the analysis of the object tracking data indicates that the object was not removed from the field.

At operation 526 camera tracking data may be received, for example relating to changes in camera position between the time of capture of said first image and the time of capture of said second image, and this tracking data may be analyzed in order to determine whether the camera was moved between the time of capture of the first and second image. At operation 528 it may be determined whether the analysis showed that the camera was moved, or changed position. Thus it may be determined that the images do not depict a three dimensional object unless the analyzing indicates that the camera changed position between the capture of the first and second image. The requirement for movement may be more stringent and require that the camera was moved by a predetermined amount or along a particular trajectory. If the analysis shows that the camera did not move, or did not move by a required amount trajectory, it may be determined that the object being viewed is not a 3D object, or not a required 3D object and the user may be rejected at operation 518.

In operation additional 530 data may be received and analyzed relating to reflection of light from the surface of the object, and the possible effect of such reflection on parameters such as color, shading, and shadows of features of the object. This may data may be collected from any one of the images for which image data is received, and may for example be from a source other than ambient light such as a torch or other artificial light source. In other words and least one of the first image data and the second image data may identify reflection of light from the object in the image from a source other than ambient light. At operation 532 it may be determined whether the analysis indicated that the object was flat. In the affirmative the user is rejected at operation 518. For example, an image of a face of a doll would not generally show changes in a shadow of a nose on the face of the doll as the doll is moved, whereas a shadow of a doll with a 3D face would be altered when an image of the object is taken from different angles. A color, shade, hue, intensity or other nature or criteria of of light that may be reflected off of a 3D object imaged at various angles may also be used to determine whether the object in the captured images is a 3D object. Thus it may be determined that the first and second images do not depict a three dimensional object unless the nature of light reflection from the object depicted in one or more of the images meets one or more predetermined criteria.

If a user has not been rejected as a result of any of the additional checks that may be applied according to operations 522-532, it may be assumed at operation 534 that the object shown in the images is the 3D object with which the game is intended to be used, the user may be accepted to play the game at operation 536, for example by issue of an authentication signal, and the recognition process may end at operation 540. The authentication signal may be issued within a processor in a computing device, such as a processor within controller 405 of computing device 400, in response to which an application such as a computer game may be opened.

It will be appreciated that with suitable hardware already available, embodiments of the invention may be achieved by suitable programming of existing apparatus. Thus embodiments of the invention may include an article such as a computer or processor transitory or non-transitory readable medium, or a computer or processor transitory or non-transitory storage medium, such as for example a memory, a disk drive, or a USB flash memory, encoding, including or storing instructions, e.g., computer-executable instructions, which, when executed by a processor or controller, cause the processor or controller to carry out methods disclosed herein. For example, embodiments of the invention may include a storage medium such as memory 420, computer-executable instructions such as executable code 425 and a controller such as controller 405.

A system according to embodiments of the invention may include components such as, but not limited to, a plurality of central processing units (CPU), e.g., similar to controller 405, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

It will be appreciated by persons skilled in the art that embodiments of the invention are not limited by what has been particularly shown and described herein. Rather the scope of at least one embodiment of the invention is defined by the claims.

The invention claimed is:

1. A method of determining that an object depicted in camera images is a three dimensional object, the method comprising:
receiving image data derived from images captured by a camera, the image data comprising at least first image data derived from a first image of an object and second image data derived from a second image of an object;
comparing said first image data and said second image data to reference data, wherein said reference data is derived from multiple images of a reference object and each of said multiple images corresponds to a different value of at least one image parameter; and
determining that the first and second images depict a three dimensional object if the result of the comparison satisfies one or more predetermined criteria,
wherein said comparing comprises:
identifying, using said reference data and said first image data, a first subset of the multiple images of the reference object that most closely match said first image;
identifying, using said reference data and said second image data, a second subset of the multiple images of the reference object that most closely match the second image;
and wherein said one or more predetermined criteria include the first and second subsets of the multiple images identified in said identifying being different from each other.

2. The method of claim 1 wherein the at least one image parameter comprises object viewing angle.

3. The method of claim 1 wherein the reference data identifies viewing angles for the images on which it is based and said comparing comprises:
identifying, using said reference data and said first image data, a first viewing angle for the first image;
identifying, using said reference data and said second image data, a second viewing angle for the second image;
and wherein said one or more predetermined criteria include the first and second viewing angles differing from each other by at least a predetermined amount.

4. The method of claim 1 wherein said image data and said reference data comprise one or more key points in the images from which they are derived.

5. The method of claim 4 wherein said comparing comprises comparing key points in said first image data with key points in the reference data and comparing key points in the second image data with key points in the reference data.

6. The method of claim 1 comprising receiving said images captured by a camera and deriving said first and second image data from said images.

7. The method of claim 1 further comprising receiving and analyzing data tracking the position of said object between the time of capture of said first image and the time of capture of said second image, and determining that the first and second images do not depict a three dimensional object unless the analyzing indicates that the object was not removed from the field of view between the capture of said first image and the capture of said second image.

8. The method of claim 1 further comprising receiving and analyzing data relating to changes in camera position between the time of capture of said first image and the time of capture of said second image, and determining that the first and second images do not depict a three dimensional object unless the analyzing indicates that the camera changed position between the capture of said first image and the capture of said second image.

9. The method of claim 1 further comprising, prior to said receiving, providing one or more instructions to capture said first and second images, wherein said first image data and said second image data are received in response to said one or more instructions.

10. The method of claim 9 wherein said instructions comprise instructions to capture images using different operating parameters.

11. The method of claim 10 wherein said operating parameters and said instructions or both are randomly generated.

12. The method of claim 9 wherein said instructions comprise instructions to capture more than two images from different angles with respect to the imaged object, such that a change in direction of camera movement is required following the capture of at least one of said more than two images.

13. The method of claim 9 wherein said one or more instructions comprise instructions to illuminate an object prior to the capture of at least one of said first and second images.

14. The method of claim 1 wherein at least one of said at least first image data and second image data identifies reflection of light from the object in the image from a source other than ambient light.

15. The method of claim 14 comprising determining that the first and second images do not depict a three dimensional object unless the nature of light reflection from the object depicted in one or more of the images meets one or more predetermined criteria.

16. The method of claim 1 comprising receiving said multiple images and generating said reference data.

17. A computing system configured to authenticate a user to use a computer program based on possession of a three dimensional object, the computing system comprising:
a memory; and
one or more processors configured to:
receive image data input comprising at least first image data derived from a first image of an object and second image data derived from a second image an object;
compare said first image data and said second image data to reference data, wherein said reference data is derived from multiple images of a reference three dimensional object captured using different operating parameters;
determine that said object depicted in said first and second images is a three dimensional object if said comparison satisfies one or more predetermined criteria; and
in response to said determination, issue an authentication signal to use the computer program,
wherein the one or more processors are further configured to issue instructions to the user to capture said first image of said object using a first operating parameter, and to capture said second image of said object using a second operating parameter.

18. The system as in claim 17, wherein said processor is to issue instructions to illuminate said object prior to the capture of at least one of said first and second images.

19. The system as in claim 17, wherein said processor is to identify reflection of light from said object in one of said images as being from a source other than ambient light.

20. A non-transitory computer readable medium comprising instructions which when executed by one or more processors in a computing system cause the system to perform a method of determining that an object depicted in camera images is a three dimensional object, the method comprising:
receiving, from a camera, image data derived from images, the image data comprising at least first image data derived from a first image of an object and second image data derived from a second image of an object, wherein the first image is captured with the camera focused on a first part of a field of view and the second image is captured with the camera focused on a second part of the field of view different from the first;
comparing the first and second image data; and
determining from said comparing whether the object is a three dimensional object,
wherein said instructions when executed by said one or more processors cause the system to further perform issuing instructions to a user to capture said first image of said object using a first operating parameter, and to capture said second image of said object using a second operating parameter.

21. The medium as in claim 20, wherein said instructions when executed by said one or more processors cause the system to randomly generate said first operating parameter and said second operating parameter.

* * * * *